United States Patent
Reddy et al.

(10) Patent No.: US 7,138,446 B2
(45) Date of Patent: Nov. 21, 2006

(54) ELASTOMERIC ADMIXTURES FOR IMPROVING CEMENT ELASTICITY

(75) Inventors: B. Raghava Reddy, Duncan, OK (US); Krishna M. Ravi, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 102 days.

(21) Appl. No.: 10/825,976

(22) Filed: Apr. 16, 2004

(65) Prior Publication Data

US 2004/0198872 A1    Oct. 7, 2004

Related U.S. Application Data

(62) Division of application No. 10/246,943, filed on Sep. 19, 2002, now abandoned.

(51) Int. Cl.
*C04B 28/02* (2006.01)
(52) U.S. Cl. .................. 524/4; 523/130; 166/294
(58) Field of Classification Search ................ 523/130; 524/4; 166/294
See application file for complete search history.

(56) References Cited

U.S. PATENT DOCUMENTS

| | | | | |
|---|---|---|---|---|
| 3,730,271 A | * | 5/1973 | Gall ............................ 166/294 |
| 4,088,808 A | | 5/1978 | Cornwell et al. ............ 428/409 |
| 4,174,230 A | * | 11/1979 | Hashimoto et al. ......... 106/660 |
| 4,460,627 A | | 7/1984 | Weaver et al. ............... 527/212 |
| 4,532,052 A | | 7/1985 | Weaver et al. ......... 252/8.55 R |
| 5,159,980 A | | 11/1992 | Onan et al. .................. 166/294 |
| 5,293,938 A | | 3/1994 | Onan et al. .................. 166/293 |
| 5,389,706 A | | 2/1995 | Heathman et al. ............. 524/5 |
| 5,588,488 A | | 12/1996 | Vijn et al. ................... 166/293 |
| 5,688,844 A | | 11/1997 | Chatterji et al. ............... 524/8 |
| 5,738,463 A | | 4/1998 | Onan .......................... 405/154 |
| 5,779,787 A | | 7/1998 | Brothers et al. ............. 106/802 |
| 5,795,924 A | | 8/1998 | Chatterji et al. ............. 523/130 |
| 5,820,670 A | | 10/1998 | Chatterji et al. ............. 109/727 |
| 5,913,364 A | | 6/1999 | Sweatman ................... 166/281 |
| 5,945,387 A | | 8/1999 | Chatterji et al. ............. 507/224 |
| 5,964,293 A | | 10/1999 | Chatterji et al. ............. 166/294 |
| 6,098,711 A | | 8/2000 | Chatterji et al. ............. 166/294 |
| 6,167,967 B1 | | 1/2001 | Sweatman ................... 166/281 |
| 6,234,251 B1 | | 5/2001 | Chatterji et al. ............. 166/295 |
| 6,271,181 B1 | | 8/2001 | Chatterji et al. ............. 507/219 |
| 6,330,917 B1 | | 12/2001 | Chatterji et al. ............. 166/295 |
| 6,632,527 B1 | | 10/2003 | McDaniel et al. ........... 428/402 |

FOREIGN PATENT DOCUMENTS

GB    1093094    11/1967
JP    02247217 A    2/1990

OTHER PUBLICATIONS

Foreign communication from a related counterpart application dated Jul. 13, 2004.

* cited by examiner

*Primary Examiner*—Peter D. Mulcahy
(74) *Attorney, Agent, or Firm*—Craig W. Roddy; Haynes & Boone LLP

(57) ABSTRACT

A method and cementing composition for sealing a subterranean zone penetrated by a well bore, wherein the cementing composition comprises a mixture of cementitious material, acrylonitrile butadiene styrene (ABS), and sufficient water to form a slurry.

38 Claims, No Drawings

ELASTOMERIC ADMIXTURES FOR IMPROVING CEMENT ELASTICITY

CROSS-REFERENCE TO RELATED APPLICATIONS

The present application is a divisional application of pending U.S. patent application Ser. No. 10/246,943 filed Sep. 19, 2002, now abandoned the entire contents of which is incorporated by reference herein.

BACKGROUND

The present embodiment relates generally to a cementing composition for sealing a subterranean zone penetrated by a well bore.

In the drilling and completion of an oil or gas well, a cementing composition is often introduced in the well bore for cementing pipe string or casing. In this process, known as "primary cementing," the cementing composition is pumped into the annular space between the walls of the well bore and the casing. The cementing composition sets in the annular space, supporting and positioning the casing, and forming a substantially impermeable barrier, or cement sheath, which isolates the well bore into subterranean zones. Thus, the undesirable migration of fluids between zones is prevented after primary cementing.

Changes in pressure or temperature in the well bore over the life of the well can result in compromised zonal isolation. Also, activities undertaken in the well bore, such as pressure testing, well completion operations, hydraulic fracturing, and hydrocarbon production can affect zonal isolation. Such compromised zonal isolation is often evident as cracking or plastic deformation in the cementing composition, or de-bonding between the cementing composition and either the well bore or the casing.

As the name implies, cementing compositions are made chiefly of cement. Due to its incompressible nature, neat cement is undesirable for use where there is a chance of expansion or contraction in the well bore. Cement has a high Young's modulus, and fractures at slight strains when subjected to stresses ("brittle failure"). When the imposed stresses exceed the stress at which the cement fails, the cement sheath can no longer provide zonal isolation. While the Young's modulus of cementing compositions can be lowered by adding silica compositions, such silica treated cementing compositions ("water-extended slurries") suffer from lower compressive and tensile strengths.

Therefore, a cementing composition that can provide greater elasticity and compressibility, while retaining high compressive and tensile strengths, is desirable for primary cementing.

DESCRIPTION

A cementing composition for sealing a subterranean zone penetrated by a well bore according to the present embodiment comprises a mixture of cementitious material ("cement"), acrylonitrile butadiene styrene (ABS) polymer, and sufficient water to form a slurry.

In another embodiment, ABS is added to water-extended slurries to create a cementing composition with a lower Young's modulus while achieving high compressive and tensile strengths.

A variety of cements can be used with the present embodiments, including cements comprised of calcium, aluminum, silicon, oxygen, and/or sulfur which set and harden by reaction with water. Such hydraulic cements include Portland cements, pozzolan cements, gypsum cements, aluminous cements, silica cements, and alkaline cements. Portland cements of the type defined and described in API Specification 10, $5^{th}$ Edition, Jul. 1, 1990, of the American Petroleum Institute are preferred. API Portland cements include Classes A, B, C, G, and H, of which API Classes A, G, and H are particularly preferred for the present embodiment. The desired amount of cement is understandably dependent on the cementing operation.

ABS used with the present embodiments is often produced as a composite material. In the production of such a composite material, a preformed elastomer such as polybutadiene or styrene butadiene rubber is used as a substrate, and styrene and acrylonitrile monomers are grafted onto the substrate by polymerization. In addition, styrene and acrylonitrile that fail to graft to the substrate copolymerize to form a matrix, with the grafted substrate dispersed in the matrix. Higher levels of butadiene in the final product increases the elastomeric properties of the composite material. In contrast, higher levels of styrene and acrylonitrile in the final product decrease the elastomeric properties of the composite material. As can be appreciated, the character of the ABS varies by the composition of the composite material, and thus affects the mechanical properties of the cementing composition.

ABS is normally sold in a fine particulate or pellet form. ABS with particle sizes ranging from 5–500 microns is preferable. More preferably, the particle size is in the 50–300 micron range, and most preferably in the 100–250 micron range. Such ABS is widely available commercially. Some examples of commercially available ABS includes BLENDEX 338™ ABS made with a 70% polybutadiene substrate (the remaining 30% being a mixture of styrene and acrylonitrile), 180 micron particle size ("Type I"), BLENDEX 336™ ABS made with a 65% styrene-butadiene rubber substrate, 180 micron particle size ("Type II"), BLENDEX 415™ ABS made with a 65% styrene-butadiene rubber substrate, 250 micron particle size ("Type III"), and BLENDEX 102S™ ABS with a 35% styrene-butadiene rubber substrate, less than 1 mm particle size ("Type IV"), all available from GE Specialty Chemicals, Parkersburg, W.Va., U.S.A. ABS is present in an amount that is 5–30% by weight of the cement in a particular cementing composition.

Water in the cementing composition is present in an amount sufficient to make a slurry which is pumpable for introduction down hole. The water used to form a slurry in the present embodiment can be fresh water, unsaturated salt solution, including brines and seawater, and saturated salt solution. Generally, any type of water can be used, provided that it does not contain an excess of compounds, well known to those skilled in the art, that adversely affect properties of the cementing composition. The water is present in an amount of about 38–70% by weight of the cement, and more preferably in an amount of about 60% by weight of the cement.

A variety of additives may be added to the cementing composition to alter its physical properties. Such additives may include slurry density modifying materials (e.g., silica flour, silica fume, sodium silicate, microfine sand, iron oxides and manganese oxides), dispersing agents, set retarding agents, set accelerating agents, fluid loss control agents, strength retrogression control agents, and viscosifying agents well known to those skilled in the art.

The following example is illustrative of the methods and compositions discussed above.

Example 1

Class G cement, silica flour, and the components in the amounts listed in TABLE 1 were added to form seven batches. The batches were prepared according to API Specification RP 10B, $22^{nd}$ Edition, 1997, of the American Petroleum Institute. For example, Batch 6 was prepared by combining 500 grams of Class G cement, 175 grams of silica flour, 50 grams of Type IV ABS (Particle size, <1 mm), and 317 grams of tap water in a Waring blender to obtain a slurry with density of 14.8 pounds per gallon. All batches had the same density.

ABS Types I–IV are described above. ABS Type V has a high butadiene content and a density of 1.040 g/cc, with a particle size less than 500 microns, and is available from Sigma-Aldrich Co., St. Louis, Mo., U.S.A.

To test each batch for various strength parameters, a portion of each batch was placed into a corresponding 2"×2" brass mold, and another portion of each batch was placed into a corresponding cylindrical plastic container provided with a lid. The seven molds and seven cylinders were cured in a 180° F. water bath for 24 hours to form samples of the batches.

Using the above-described samples, the strength parameters were measured by a strength testing instrument manufactured by Tinius Olsen, Willow Grove, Pa., U.S.A., according to the American Society for Testing and Materials ASTM C 109 procedure. The tensile strengths were measured on the same instrument according to the ASTM C 190–97 procedure. The burst strengths were measured on an MTS load frame instrument manufactured by MTS Systems Corporation, Eden Prairie, Minn., U.S.A. The Young's modulus, Poisson's ratio, Brazilian tensile strength, and permeability were also determined for each batch, and are listed in TABLE 1.

TABLE 1

| Components | Batch 1 | Batch 2 | Batch 3 | Batch 4 | Batch 5 | Batch 6 | Batch 7 |
|---|---|---|---|---|---|---|---|
| Water % bwoc | 72 | 62.5 | 61.6 | 61.6 | 58 | 63.3 | 58 |
| ABS Type | — | Type I | Type II | Type III | Type III | Type IV | Type V |
| ABS % bwoc | — | 10 | 10 | 10 | 15 | 10 | 15 |
| Compressive strength, psi | 1320 | 1950 | 1750 | 1800 | 2060 | 1990 | 2680 |
| Tensile strength, psi | — | 270 | 284 | 284 | — | 300 | — |
| Burst strength, psi | — | 264 | 255 | 270 | — | — | — |
| Young's modulus | 0.460 | 0.858 | 0.861 | 0.720 | 0.427 | 0.728 | 0.879 |
| Poisson's ratio | 0.114 | 0.139 | 0.142 | 0.128 | 0.118 | 0.130 | 0.138 |
| Brazilian tensile strength, psi | 98 | 210 | 194 | 220 | 180 | 255 | 222 |
| Permeability, mD | — | 0.020 | 0.016 | 0.020 | — | — | — |

TABLE 1 shows that Batch 1, the water-extended slurry, had poor compressive strength, even though the Young's modulus value was low. This can result in failure of the cement sheath to provide effective zonal isolation. In contrast, the ABS batches, Batches 2–7, had much higher compressive strengths, and favorable tensile strengths (where measured). TABLE 1 also shows that selection of the ABS type affects the mechanical properties of the cementing composition, thus allowing the cementing composition to be tailored to suit conditions in a particular well bore.

It is speculated that the acrylonitrile in ABS hydrolyzes in the cement slurries and generates carboxylates which facilitate bonding of the normally incompatible elastomer to the cement. Such bonding may allow dissipation of imposed stresses, thus preventing brittle failure of the cement sheath.

Using the raw stress-strain data used in the determination of the compressive strength, Young's modulus, and Poisson's ratios listed in TABLE 1, the areas under the curves extending from no stress to the maximum stress (reached at the ultimate yield point) in the axial stress-strain and radial stress-strain graphs were determined, and the values are listed in TABLE 2. The Young's modulus and Poisson's ratio listed in TABLE 2 correspond to the values observed at the maximum stress. Batch 7 was not tested.

TABLE 2

| Components | Batch 1 | Batch 2 | Batch 3 | Batch 4 | Batch 5 | Batch 6 |
|---|---|---|---|---|---|---|
| Stress at ultimate yield point, psi | 1130 | 2070 | 2080 | 1690 | 1300 | 2370 |
| Area under curve for axial displacement at ultimate | 2270 | 6000 | 4730 | 4290 | 3662 | 7280 |

TABLE 2-continued

| Components | Batch 1 | Batch 2 | Batch 3 | Batch 4 | Batch 5 | Batch 6 |
|---|---|---|---|---|---|---|
| yield point, Kpsi × microinch/inch | | | | | | |
| Area under curve for radial displacement at ultimate yield point, Kpsi × microinch/inch | 640 | 1430 | 750 | 1135 | 1050 | 1000 |
| Poisson's ratio at ultimate yield point | 0.210 | 0.207 | 0.143 | 0.220 | 0.219 | 0.128 |
| Young's modulus at ultimate yield point, psi | 0.336e+6 | 0.476e+6 | 0.580e+6 | 0.444e+6 | 0.298e+6 | 0.510e+6 |

The maximum stress at the ultimate yield point indicates the ability of the cementing composition to absorb the imposed stresses without failing, and the ABS containing Batches 2–6 all showed greater stress values than Batch 1. The resiliency of the composition is indicated by higher ratios of the area under radial stress-strain curve to the area under axial stress-strain curve. While the ability of Batches 2–6 to plastically deform without failing could not be directly quantified, it was apparent that they plastically deformed past the load bearing stage.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A wellbore cement composition comprising:
   cement;
   acrylonitrile butadiene styrene polymer in particulate form; and
   water, wherein the cement, the acrylonitrile butadiene styrene polymer in particulate form, and the water are present in relative amounts effective to provide the cement composition with a strength sufficient to achieve zonal isolation in a wellbore penetrating a subterranean zone.

2. The composition of claim 1 wherein the cement is Portland cement, pozzolan cement, gypsum cement, aluminous cement, silica cement, or alkaline cement.

3. The composition of claim 1 wherein the water is present in a range of about 38% to about 70% by weight of the cement.

4. The composition of claim 1 wherein the acrylonitrile butadiene styrene polymer is made with a 70% polybutadiene substrate.

5. The composition of claim 1 wherein the acrylonitrile butadiene styrene polymer is made with a 65% styrene-butadiene rubber substrate.

6. The composition of claim 1 wherein the acrylonitrile butadiene styrene polymer is made with a 35% styrene-butadiene rubber substrate.

7. The composition of claim 1 wherein the acrylonitrile butadiene styrene polymer is present in a range of about 5% to about 30% by weight of the cement.

8. The composition of claim 1 wherein the acrylonitrile butadiene styrene polymer has a particle size in the range of 5 microns to 500 microns.

9. The composition of claim 1 wherein the acrylonitrile butadiene styrene polymer has a particle size in the range of 50 microns to 300 microns.

10. The composition of claim 1 wherein the acrylonitrile butadiene styrene polymer has a particle size in the range of 100 microns to 250 microns.

11. The composition of claim 1 further comprising a density modifying material, dispersing agent, set retarding agent, set accelerating agent, fluid loss control agent, strength retrogression control agent or viscosifying agent.

12. The composition of claim 1 further comprising silica flour, silica fume, sodium silicate, microfine sand, iron oxide or manganese oxide.

13. The composition of claim 1 further comprising silica flour.

14. A wellbore cement composition comprising:
   cement;
   acrylonitrile butadiene styrene polymer present in particulate form in a range of 5% to 30% by weight of the cement; and
   water present in a range of about 38% to about 70% by weight of the cement,
   wherein the cement, the acrylonitrile butadiene styrene polymer in particulate form, and the water are present in relative amounts effective to provide the cement composition with a strength sufficient to achieve zonal isolation in a wellbore penetrating a subterranean zone.

15. The composition of claim 14 wherein the cement is Portland cement, pozzolan cement, gypsum cement, aluminous cement, silica cement, or alkaline cement.

16. The composition of claim 14 wherein the acrylonitrile butadiene styrene polymer is made with a 70% polybutadiene substrate.

17. The composition of claim 14 wherein the acrylonitrile butadiene styrene polymer is made with a 65% styrene-butadiene rubber substrate.

18. The composition of claim 14 wherein the acrylonitrile butadiene styrene polymer is made with a 35% styrene-butadiene rubber substrate.

19. The composition of claim 14 wherein the acrylonitrile butadiene styrene polymer has a particle size in the range of 5 microns to 500 microns.

20. The composition of claim 14 wherein the acrylonitrile butadiene styrene polymer has a particle size in the range of 50 microns to 300 microns.

21. The composition of claim 14 wherein the acrylonitrile butadiene styrene polymer has a particle size in the range of 100 microns to 250 microns.

22. The composition of claim 14 wherein the acrylonitrile butadiene styrene polymer is present in a range of 10% to 15% by weight of the cement.

23. The composition of claim 14 further comprising a density modifying material, dispersing agent, set retarding agent, set accelerating agent, fluid loss control agent, strength retrogression control agent or viscosifying agent.

24. The composition of claim 14 further comprising silica flour, silica fume, sodium silicate, microfine sand, iron oxide or manganese oxide.

25. The composition of claim 14 further comprising silica flour.

26. A wellbore cement composition comprising:
cement;
acrylonitrile butadiene styrene polymer present in particulate form with a particle size of less than 1 mm; and water,
wherein the cement, the acrylonitrile butadiene styrene polymer in particulate form, and the water are present in relative amounts effective to provide the cement composition with a strength sufficient to achieve zonal isolation in a wellbore penetrating a subterranean zone.

27. The composition of claim 26 wherein the cement is Portland cement, pozzolan cement, gypsum cement, aluminous cement, silica cement, or alkaline cement.

28. The composition of claim 26 wherein the acrylonitrile butadiene styrene polymer is made with a 70% polybutadiene substrate.

29. The composition of claim 26 wherein the acrylonitrile butadiene styrene polymer is made with a 65% styrene-butadiene rubber substrate.

30. The composition of claim 26 wherein the acrylonitrile butadiene styrene polymer is made with a 35% styrene-butadiene rubber substrate.

31. The composition of claim 26 wherein the acrylonitrile butadiene styrene polymer is present in a range of about 5% to about 30% by weight of the cement.

32. The composition of claim 26 wherein water is present in a range of about 38% to about 70% by weight of the cement.

33. The composition of claim 26 wherein the acrylonitrile butadiene styrene polymer has a particle size in the range of 5 microns to 500 microns.

34. The composition of claim 26 wherein the acrylonitrile butadiene styrene polymer has a particle size in the range of 50 microns to 300 microns.

35. The composition of claim 26 wherein the acrylonitrile butadiene styrene polymer has a particle size in the range of 100 microns to 250 microns.

36. The composition of claim 26 further comprising a density modifying material, dispersing agent, set retarding agent, set accelerating agent, fluid loss control agent, strength retrogression control agent or viscosifying agent.

37. The composition of claim 26 further comprising silica flour, silica fume, sodium silicate, microfine sand, iron oxide or manganese oxide.

38. The composition of claim 26 further comprising silica flour.

* * * * *